March 18, 1924. 1,487,068

F. X. KUHN

SLICING OR CUTTING MACHINE

Filed May 10, 1920 6 Sheets-Sheet 1

Inventor:
Frederick Xenophon Kuhn,
by Emery, Booth, Janney & Varney
Attys.

March 18, 1924. 1,487,068
F. X. KUHN
SLICING OR CUTTING MACHINE
Filed May 10, 1920 6 Sheets-Sheet 4

Inventor:
Frederick Xenophon Kuhn
by Emery, Booth, Janney & Varney
Attys.

March 18, 1924. 1,487,068
F. X. KUHN
SLICING OR CUTTING MACHINE
Filed May 10, 1920 6 Sheets-Sheet 5

Inventor:
Frederick Xenophon Kuhn,
by Emery, Booth, Janney & Varney
Attys.

March 18, 1924.

F. X. KUHN 1,487,068

SLICING OR CUTTING MACHINE

Filed May 10, 1920  6 Sheets-Sheet 6

Inventor:
Frederick Xenophon Kuhn,
by Emery, Booth, Janney & Varney
Attys.

Patented Mar. 18, 1924.

1,487,068

UNITED STATES PATENT OFFICE.

FREDERICK XENOPHON KUHN, OF BROOKLINE, MASSACHUSETTS, ASSIGNOR TO MOJONNIER BROS. CO., A CORPORATION OF ILLINOIS.

SLICING OR CUTTING MACHINE.

Application filed May 10, 1920. Serial No. 380,194.

*To all whom it may concern:*

Be it known that I, FREDERICK XENOPHON KUHN, a citizen of the United States, and a resident of Brookline, county of Norfolk, and Commonwealth of Massachusetts, have invented an Improvement in Slicing or Cutting Machines, of which the following description, in connection with the accompanying drawings, is a specification, like characters on the drawings representing like parts.

This invention relates to cutting or slicing machines, and more particularly to machines for cutting slabs or blocks of plastic or other relatively soft material, such as ice cream or other frozen materials into smaller portions or bricks.

The invention and its aims and objects will be best understood from the following description, taken in connection with the accompanying drawings, of one form or embodiment of the invention herein shown and described for illustrative purposes, it being understood that the invention in its true scope, is definitely set forth by the claims.

In the illustrative embodiment of the invention herein shown, the frame may be of any suitable construction, said frame herein comprising two longitudinally extending spaced frame members 2, which may conveniently consist of I-irons joined at their opposite ends by transverse members of any suitable construction, not shown. At each end of said side frame members 2 there are conveniently provided legs 4, bolted or otherwise rigidly secured to said side frame members.

Figure 4:
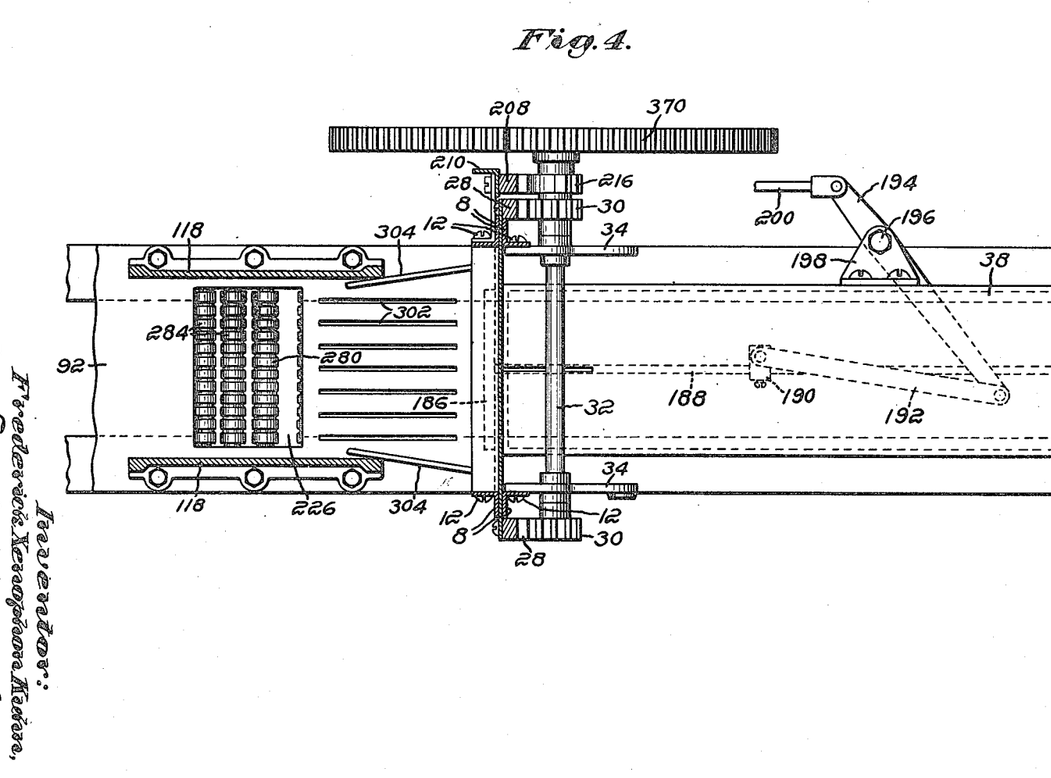
Fig. 4 is a top plan view of certain parts of the construction shown in Fig. 1, partly in section.

The cutter or slicing means comprises a knife or cutter 6 extending transversely of the machine and adapted to be reciprocated vertically, said cutter to that end being guided at its opposite edges between the flanges 8 of vertically disposed angle-irons 10, Fig. 4, two at each side of the machine in the same transverse plane, said angle irons being secured at their lower ends to the webs of the I-irons 2 by bolts 12 passing through blocks 14 fitted into the outside recesses of said I-irons. The angle irons 10 upon opposite sides of the machine are rigidly connected by a cross head 16 to which their upper ends may be secured in any suitable manner.

Figures 1, 10, 11:
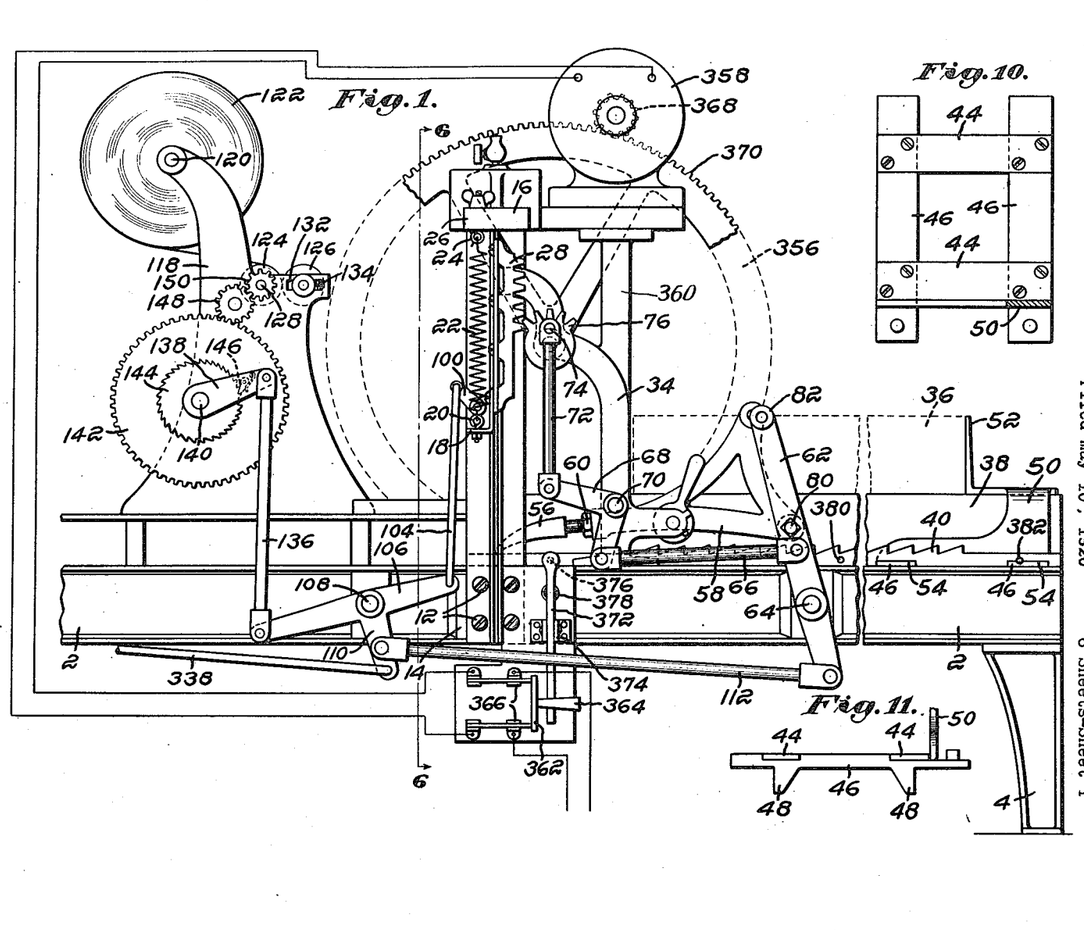
Fig. 1 is a side elevation of one end of a machine of the general character described embodying one illustrative form of the invention.
Fig. 10 is a plan view of the feed carriage.
Fig. 11 is an end elevation of the feed carriage.

The marginal portion of the cutter 6 extends beyond the outer ends of the flanges 8 of the angle irons 10 and to the lower end of each of said marginal portions there is rigidly secured, in any suitable manner, an angle member 18, Fig. 1, the horizontal flange of which carries an eye-bolt 20, to which is secured in any suitable manner the lower end of a helical spring 22. The upper end of said helical spring is secured to an eye-bolt 24 extending through the part 26, Fig. 1, of the cross head and is provided upon its upper end with a wing nut 26 whereby the tension of the spring may be varied or adjusted as desired. These springs 22 upon opposite sides of the machine tend to maintain the cutter elevated and to return it to elevated position after each downward cutting stroke.

Any suitable mechanism may be provided to lower the cutter for the cutting stroke. In the embodiment of the invention herein disclosed, there are rigidly secured to the marginal portions of the cutter on opposite sides of the machine, outside of the flanges 8 of the angle irons 10, racks 28, 28 which are adapted to mesh with mutilated gears 30, 30 rigidly secured upon a shaft 32, adjacent opposite ends of the latter, Fig. 4, said shaft being journalled in the upper end of curved standards 34, 34.

From the construction described it will be apparent that the cutting knife will be moved down relatively slowly by the mutilated gears for the cutting stroke, but that as soon as these gears release the racks the knife will be moved rapidly upward by the springs 22.

The ice cream block or slab 36 is placed upon a feed table 38 upon which it is fed to the cutter mechanism. Any suitable feeding mechanism may be used, but herein I preferably use a step by step feed mechanism comprising a pawl and rack. The rack is indicated at 40 and will preferably be removably secured to the feed carriage. The feed table 38 is secured in any suitable manner at its opposite ends to the side frame members 2 and a space will be left between the lower edge of the feed table and the said side frame members for the reception of the feed carriage. The latter consists of a frame comprising two longitudinal members 44, 44 and the two transverse members 46, 46. The latter rest at their opposite ends upon the upper surface of the side frame members 2 and are provided with downwardly projecting guide members 48, 48 to engage the inner edges of the side frame members 2 and guide the feed carriage in its movement along the latter. To one end of the rear transverse member 46 of the feed carriage is secured, in any suitable manner, a bracket 50 which extends upwardly and over the top of the feed table 38 and carries a follower 52 to engage the rear end of the block of ice cream and move it forwardly toward the cutter mechanism as the feed carriage is moved forwardly by the pawl. Said follower 52 is provided with vertical central slot to receive the longitudinal cutter hereinafter described. For removably securing the rack 40 to the feed carriage said rack is provided upon its under side with two recesses 54, 54 which fit over the outer ends of the two transverse members 46, 46 of the feed carriage.

The feed pawl 56 is screwed into a triangular member 58, thus permitting longitudinal adjustment of the pawl, a lock nut 60 being provided to lock the pawl in adjusted position. The triangular member 58 is pivotally connected, in a manner hereinafter more fully described, to one arm of a two arm lever 62 pivoted at 64 to the frame of the machine and connected by a link 66 with one arm of a bell crank lever 68 pivoted at 70 to one of the standards 34. The other arm of this bell crank lever 68 is pivotally connected to a push rod 72 pivoted at its other end to a crank pin 74 on a crank disk 76 fixed upon one end of the main shaft 32.

From the construction described it will be seen that rotation of the main shaft acting through the intermediate connections described will reciprocate the pawl 56, thus causing it to cooperate with the teeth of the rack 40 to feed the feed carriage and the ice cream block toward the cutter mechanism. The step by step feed movement is so timed that the material is fed forward one step between every two reciprocations of the cutter.

The cutter means herein used is similar to that described in my Patent No. 1,368,442, dated February 15, 1921, and for a full description of said cutter means reference is made to said patent. For an understanding of the present invention it will suffice to state that, as in said application, an additional longitudinal cutter 78 is removably secured in any suitable manner, as in said patent for example, to the transverse cutter 6 already referred to. This second cutter extends perpendicularly to the face of the cutter 6 at a point half way between the two ends of the latter.

It will thus be seen that the cutter having the two cutter blades described, will at each downward stroke make both a transverse cut extending throughout the whole width of the ice cream block and a longitudinal cut extending centrally of the latter. With the cutter mechanism described therefor two pieces of ice cream in the same transverse plane will be severed simultaneously from the ice cream block.

If it is not desired to sever two pieces simultaneously as described, the cutter 78 may be removed.

In practice cakes of ice cream are usually about twenty-four inches in length. It is customary to divide these cakes or blocks into bricks or pieces of such thickness that there shall result six bricks to the quart, seven bricks to the quart or 8 bricks to the quart. Where it is desired to have six bricks to the quart the cakes or blocks are cut into forty-eight bricks, where seven to the quart are desired the block is cut into fifty-six bricks, and in case of eight to the quart into sixty-four bricks. As two pieces or bricks extending in the same transverse plane are cut at each cutting stroke of the cutter means, the result is that when a cake is cut into six bricks to the quart, each brick or piece will be about one inch in thickness. Where there are seven bricks to the quart, each will be approximately eight-tenths of an inch in thickness, and in case of eight bricks to the quart, the thickness of each brick will be approximately seven-tenths of an inch. As the length of the feed stroke of the pawl 56 is dependent on the length of the tooth of the rack used, it will therefore be seen that by providing three separate racks having teeth approximately one inch, eight-tenths and seven-tenths of an inch in length respectively, the block 36 may be divided into pieces of any of the three usual thicknesses, the stroke of the pawl being suitably adjusted. Any suitable and usual means for variably adjusting the feeding stroke of the pawl may be used, but herein the triangular member 58 is conveniently pivotally connected to the lever 62 by a removably pivoted pin 80, at the lower right hand apex of said triangular member (see Fig. 1). The parts are so proportioned that when the triangular member is connected to the lever at this point the feed stroke of the pawl will be a little over one inch, and it will, therefore, be apparent that the pawl will feed the block 36 correctly under these conditions whether the rack used has teeth one inch in length, teeth eight-tenths of an inch in length or teeth seven-tenths of an inch in length. This single adjustment thus serves for dividing the block 36 into pieces of any of the three usual thicknesses. By varying the point of connection of the triangular member to the lever 12, or in any other suitable manner, the feeding stroke of the pawl can be varied to cut bricks of any desired thickness.

As already stated the feed racks are removably secured to the feed carriage so that they are readily interchangeable.

If it is desired to divide the block 36 into pints, this may be accomplished by withdrawing the pivot pin 80 from the point in the lever 62 where it connects the latter to the lower apex of the triangular member 58 and inserting it in an opening 82 provided in the upper free end of the lever 62 and in a similar opening provided in the upper right-hand apex of said triangular member, thus pivotally connecting the latter to the free end of the lever 62. When thus connected the feed stroke of the pawl 56 is a little over three inches so that by using a rack having teeth one inch in length the block of ice cream will be fed forward three inches at each feed stroke of the pawl, and at each downward stroke of the cutter two pieces situated in the same transverse plane and each three inches in thickness, that is to say each corresponding to a pint, will be severed from the block 36.

In the downward stroke of the cutter the knife 78 enters a longitudinal slot 84 provided in the upper surface of the feed table, while the lower edge of the cutter 6 enters the space 86 provided between the end face of the feed table and the vertical member of an angle iron 88, the horizontal member of which forms a continuation of the feed table.

Figure 6:
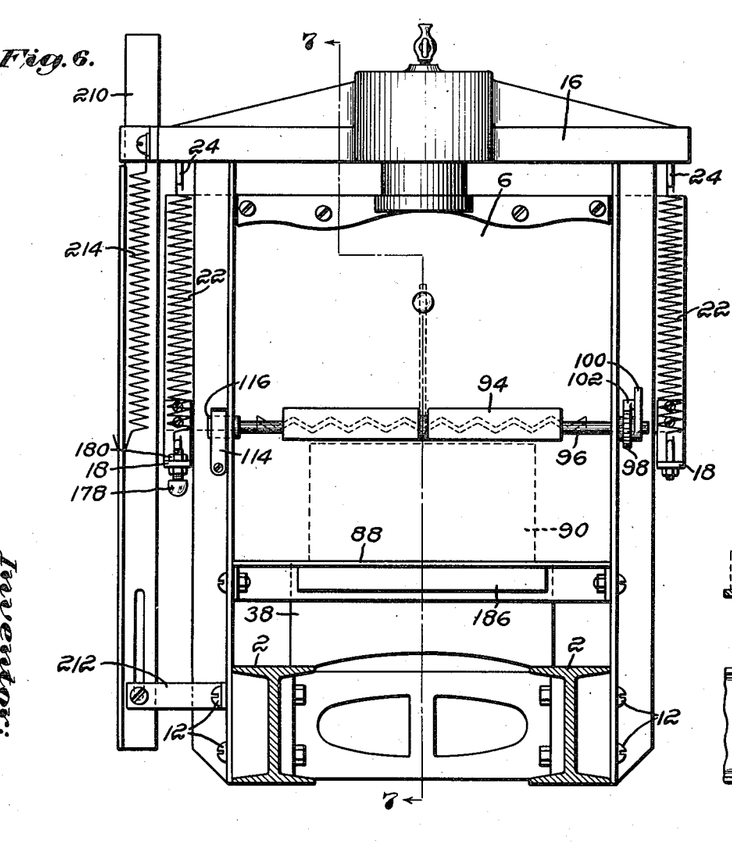
Fig. 6 is a vertical cross section on line 6—6 of Fig. 1.
Figure 7:
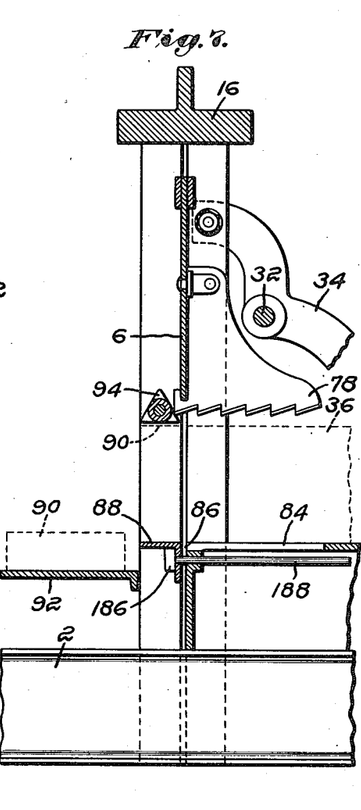
Fig. 7 is a section on line 7—7 of Fig. 6.

It is desirable that the severed bricks 90, Fig. 7, shall be deposited on a table 92 in the position shown in dotted lines in Fig. 7, that is to say flatwise or upon their broader surface. In order to make sure that the severed bricks 90 shall be deposited in this position I have provided suitable means in accordance with the present invention, said means herein comprising a rod 94 preferably of wood and of triangular shape in cross section, said block extending transversely of the feed table at a level just above that of the upper surface of the ice cream block 36. This triangular rod 94 is mounted upon a shaft 96, Fig. 6, just back of the knife 6 and upon one end of said shaft 96 there is secured a ratchet 98. Upon the end of said shaft 96 outside of said ratchet 98 there is rotatably mounted an arm 100 to which is pivotally secured a pawl 102 to cooperate with the ratchet 98. The free end of the arm 100 is connected by a link 104 to one arm 106 of a three armed lever pivoted at 108 to the frame of the machine and another arm 110 of which is connected by a link 112 to the lower end of the lever 62 already referred to. The feeding movement imparted to the lever 62 for actuating the feed pawl as already described imparts to the pawl 102 through link 112, lever 106, 110, link 104 and arm 100 an oscillatory movement whereby said ratchet 98 will be turned step by step and with it the triangular rod 94. A flat spring 114 secured at one end to one of the left-hand angle irons 10, Fig. 6, bears with its free end against a triangular block 116 fixed to the left end, referring to said figure, of the shaft 96, the surfaces of said triangular block being in the same plane as the surfaces of the triangular rod 94. When the triangular rod 94 is turned a step, as above described, it will thus be always arrested and held in such a position that the lower surface of the triangular rod 94 will be parallel to the upper surface of the ice cream block 36, as shown in Fig. 7. When two blocks 90 are severed from the ice cream block 36 by a downward stroke of the knife, they rest upon the horizontal member of the angle iron 88, as shown in Figs. 6 and 7, and while in that position after the knife has been raised, the pawl 102 will be actuated by the next feed stroke of the lever 62 to turn the triangular rod 94 in a clockwise direction, Fig. 7, whereby the right-hand lower corner of said triangular rod will engage the upper ends of the two severed bricks 90 resting on the angle iron 88 and tip them to the left, Fig. 7, so that they will drop into the position shown in said figure on the table 92.

The present invention contemplates the provision of a wrapping mechanism to wrap the severed bricks of ice cream automatically, as well as means to feed the bricks from the cutter mechanism to said wrapping mechanism. In the embodiment of the invention herein described the wrapping mechanism may conveniently be constructed as follows.

In the upper ends of two standards 118, Figs. 1, 4, 5 and 8, rising from opposite sides of the frame there is mounted the shaft 120 to receive a roll of paper 122. From this roll the strip of paper 122 passes downwardly between a feed roll 124 and a presser roll 126 mounted on shafts 128 and 130 respectively, carried in suitable bearings provided with the two standards 118. The shaft 130 of the presser roll 126 will preferably be mounted in horizontal slots 132 and will be yieldingly pressed toward the feed roll 124 by springs 134 mounted in said slots whereby the presser roll 126 will yieldingly clamp the paper between said two rolls. Step by step feeding movement is herein communicated to the feed roll 124 by any suitable actuating mechanism, said mechanism herein comprising a link 136 connected at one end to the third arm of the three arm lever already referred to (see Fig. 1) and at its other end to an arm 138 mounted for swinging upon a stud shaft 140 projecting from the standard 118. Upon this stud shaft is rotatably mounted a gear 142 having integral therewith a ratchet 144 with the teeth of which a pawl 146 pivotally mounted upon the oscillatory arm 138 is adapted to cooperate. The gear 142 meshes with a smaller gear 148 which in turn meshes with a pinion 150 secured to the feed roll shaft 128. From the construction described it will be apparent that the swinging movement of the three arm lever upon the shaft 108 will impart to the link 136 a vertical reciprocatory movement and that upon each downward movement of said link the pawl 146 will rotate the gear 142 one increment, thus through the gear 148 rotating the pinion 150 a proportionate amount to feed the strip of paper downwardly the predetermined distance required.

In the embodiment of the invention herein shown guide means are provided to guide the strip of paper in its downward movement. Said guiding means may be of any suitable construction but herein conveniently comprises two parallel series of spaced vertical rods 152, one series upon each side of the path in which the paper travels. These rods 152 are secured in any suitable manner at their opposite ends to bars 154, 154, 154, 154 extending transversely of the machine between the standards 118 to which they are secured in any suitable manner as by bolts 156, 156, 156, 156.

The invention also contemplates the provision of a suitable cutter means to sever from the paper supply the length of paper strip necessary for wrapping each separate brick. Herein only three sides of each brick are wrapped, namely the leading surface of the brick and the upper and the lower surfaces thereof as shown at 158 in Fig. 8. The cutter means may be of any suitable construction and herein conveniently comprises two cutter blades 160 and 162 extending transversely of the machine upon opposite sides of the path of the paper and pivotally secured at their opposite ends to disks 164, 164 rotatably mounted upon pivots 166, 166 secured to said standards. To one of said disks 164 is secured an arm 168, Fig. 5, pivotally connected by a link 170 to one arm 172 of a bell crank lever pivoted at 174 to the frame of the machine. The other arm 176 of said bell crank lever has its free end in the path of movement of a striker 178 having screw-threaded connection with a screw-threaded socket 180 secured to one of the angle members 18 already described as secured to the marginal portion of the ice cream cutter 6. From the construction just described it will be seen that at each downward movement of the ice cream cutter 6 the striker 178 will meet the arm 176 of the bell crank lever and rock the latter upon its pivot, thus swinging the disk 164 to which the arm 168 is connected about its pivot. By reason of the pivotal connection of the blades 162 and 160 with the disks 164, said blades will thus be moved longitudinally in opposite directions and toward each other so as to sever the strip of paper extending downwardly between them with a shearing cut. A stripper 182 will preferably be slidably mounted upon the blade 160 and pressed toward the cutting edge of the latter so as normally to register therewith by a spring 184. The screw-threaded connection of the striker 178 with its socket 180 provides for adjustment of the cutting stroke of the blades 160, 162.

Where the knife 78 is not used so that the severed bricks extend the full width of the ice cream block, the paper roll 132 will comprise a single strip of a width equal to the width of the ice cream block. Where on the contrary the cutter 78 is used so that two bricks in the same transverse plane are presented simultaneously to the wrapping mechanism, two rolls of paper each of approximately half of the width of the ice cream block will be mounted side by side on the shaft 120. These two strips will extend downwardly side by side between the rolls 124 and 126 and between the guides and cutters in the same manner that the single strip would.

In the embodiment of the invention herein shown the wrapping of the bricks is effected by moving the leading, narrower face of the bricks into contact approximately with the center of the strip of paper of the length necessary to wrap the three sides of the brick, said length of paper being then severed by the cutter mechanism above described so that in the continued forward movement of the brick it will be wrapped about the upper and lower surfaces of the brick by means cooperating therewith.

Figures 5, 12:
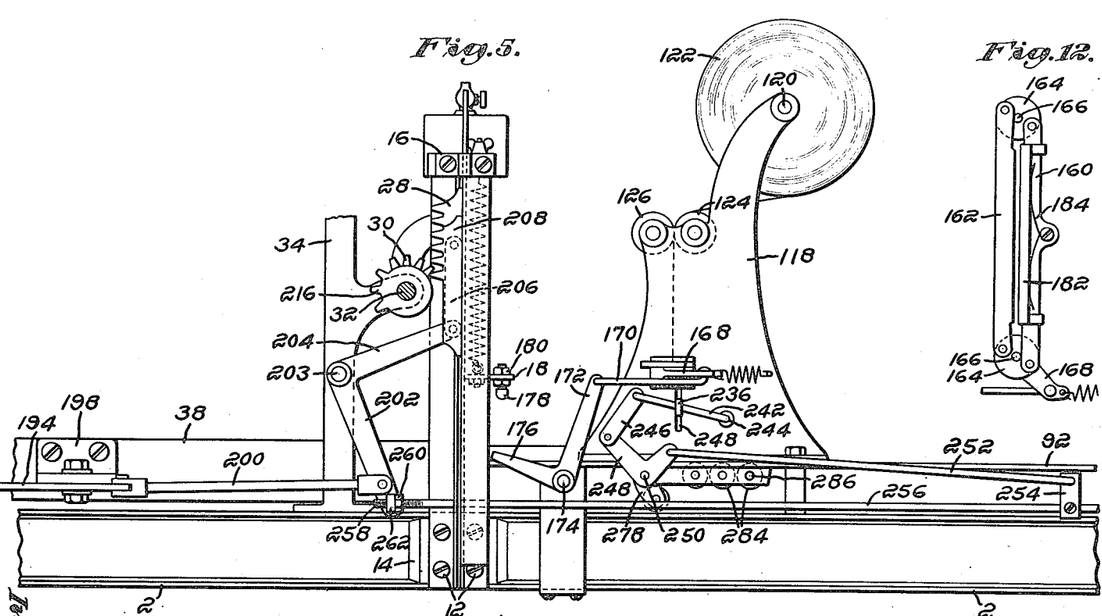
Fig. 5 is a side elevation of the part of the machine shown in Fig. 1, but seen from the opposite side of the machine.
Fig. 12 is a plan view of the paper cutter mechanism.

The invention accordingly contemplates the provision of means to present the bricks to the wrapping mechanism, said means herein comprising a pusher or follower 186, Figs. 4, 6 and 7, extending transversely of the machine upon a level with the upper surface of the table 92 and of a length equal substantially to the width of the ice cream block 36. This pusher 186 is secured to the front end of a rod 188 having adjustably clamped thereto at 190 one end of a link 192, the other end of which is pivoted to one end of a lever 194 pivoted at 196 to a bracket 198 secured in any suitable manner to the frame of the machine. To the other end of said lever 194 is pivotally connected one end of a rod 200 having its opposite end pivotally connected to one arm 202 of a bell crank lever pivoted at 203 to one of the standards 34. The other arm 204 of said bell crank lever is pivotally connected to the lower end of a link 206 having its upper end pivotally connected to a rack 208. This rack 208 is secured to a vertical slide 210 having sliding engagement at its upper end with the cross head 16 and at its lower end with a bracket 212 secured to the frame of the machine. A spring 214 secured at its upper end to said cross head and at its lower end to said slide tends to maintain the slide and rack in raised position as shown in Fig. 5. A mutilated gear 216 mounted upon the main shaft 32 is adapted to cooperate with said rack 208 to move the latter downwardly at the proper time and through the connections above described to advance the pusher 186 and cause the latter to move the severed brick or bricks deposited upon the table 92 along said table to present them to the wrapping mechanism. As soon as the toothed portion of the mutilated gear quits the rack 208, the latter will be quickly raised by the spring 214 thus retracting the pusher 186 into its normal position, Fig. 7.

Preferably additional guiding means for the paper will be provided below the cutters 160 and 162. Herein said guiding means may conveniently consist of a series of vertically disposed spaced rods 218 secured at their upper and lower ends to transverse rods 220 extending between the standards 118. Cooperating with said rods 218 upon the other side of the path of the paper is provided a vertical plate 222 having flanged end portions secured by bolts 224 or in any other suitable manner to the standards 118.

It will be noted that the guiding means just described extend downwardly substantially to the top level of the bricks so that the paper will be correctly guided to that point. However, owing to the paper being supplied from a roll as above stated, the free end of the paper strip or strips shows a tendency to curl or deviate from the straight line in the direction in which it was rolled upon the roller. This might prevent the paper from passing downwardly through the opening 226 provided in the plate 92 as it should after it is deprived of the guidance of the guiding means above described. Should this occur the paper would not be properly positioned relative to the brick to be wrapped. I have, therefore, deemed it convenient to provide positioning means positioned upon that side of the sheet of paper toward which the end of the sheet tends to curl or deviate so as to cause the sheet or sheets of paper to pass correctly down through the opening 226 during its feed movement, thus properly to position the paper relative to the brick to be wrapped. Such positioning means to be effective must extend into proximity with the upper face of the plate 92 and would thus be in the path of movement of the bricks of ice cream as they are advanced to the wrapping means. It is, therefore, necessary that the positioning means be removable from the path of movement of the ice cream bricks as the latter are advanced into contact with the paper strip for wrapping. In order to meet these requirements the positioning means may conveniently consist of a slide 228 having two downwardly projecting extensions 230, 230, said slide being slidingly mounted at its opposite vertical edges in vertical guides 232, 232 on the guide plate 222 above described. Upon said guide plate 222 is pivoted at 234 a lever 236 having one end pivoted at 238 to the slide 228 and its other end slotted at 240 to receive a rod 242 pivoted at 244 to the standard 118 and at its other to one end of a link 246. The lever 236 extends through a vertical slot 248 pivoted in the standard 118, the slot 240 in the free end of said lever being outside of said standard 118 where it is engaged as described by said rod 242.

The other end of the link 246 is pivotally connected to one arm of the bell crank lever 248 rigidly secured to a shaft 250 rotatably mounted in the side frame members of the machine. The other arm of said bell crank lever 248 is connected to a rod 252, the free end of which is secured by a clamp 254 to a rod 256. This rod 256 has one end screw-threaded at 258, Fig. 5. A nut 260 is screwed onto the screw-threaded end 258 of said rod and the free, screw-threaded end of the rod is passed through an ear 262 on the lower end of the bell crank lever 202 already described for actuating the pusher 186.

Figure 3:
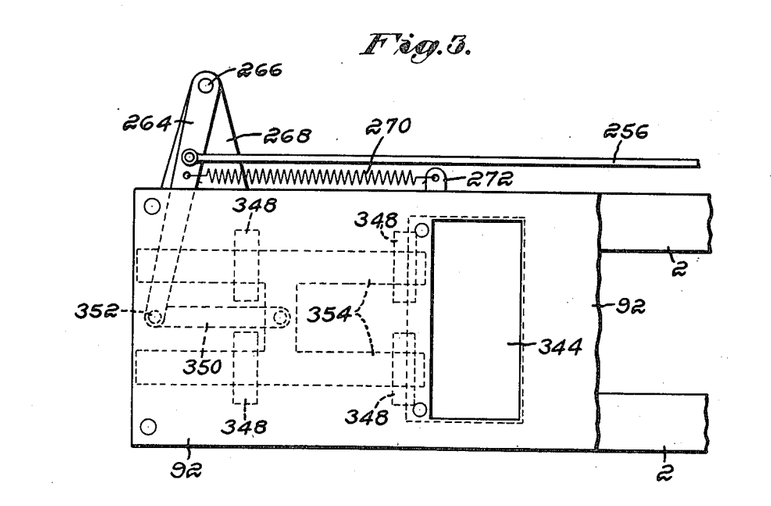
Fig. 3 is a top plan view of the construction shown in Fig. 2.

At its opposite end, Fig. 3, the rod 256 is pivoted to a lever 264 pivoted at 266 to a bracket 268 projecting laterally from the frame of the machine. A spring 270 secured at one end to the lever 264 and at its other end to a lug 272 projecting from the frame of the machine tends to draw the rod 256 to the left, referring to Fig. 5, so as to maintain the nut 260 on the rod 256 in abutting contact with the ear 262 on the lever 202. It will thus be seen that when the bell crank lever 202 swings to the right, Fig. 5, it will move the rod 256 to the right, Fig. 5, and thus through the connection 254, rod 252, bell crank lever 248, link 246, rod 242 and lever 236 lower the positioning slide 228, while when the bell crank lever 202 is moved in the opposite direction, to the left, Fig. 5, the spring 270 will cause the rod 256 to follow up said motion, thus through the connections above described raising the positioning slide 228. This mechanism is so timed that the positioning slide 228 being normally depressed will be raised temporarily at the proper time to avoid being struck by the advancing ice cream brick.

Means are preferably provided for clamping the severed length of paper so as to prevent said length of paper from falling down through the opening 226 after it is severed by the cutters 160, 162. The actuating mechanism for this clamping means is so timed as to clamp the length of paper shortly before or substantially at the moment of severance. Any suitable means may be used for this purpose, but I preferably use a roll 274, Figs. 5 and 8, extending transversely of the machine throughout the width of the paper strip and mounted for free rotation upon a rod 276 secured at its opposite ends in arms 278, 278. These arms are rigidly secured to the shaft 250 to which is rigidly secured the bell crank lever 248 above described forming part of the mechanism for actuating the positioning slide 228. The arrangement is such that when the positioning slide 228 is raised by its actuating mechanism the latter swings the roll 274 upwardly from the full line position shown in Fig. 8 into the dotted line position in said figure, thus clamping the length of paper between said roll 274 and another roll 280 mounted for free rotation upon a rod 282 extending transversely of the machine, Figs. 4 and 8. When the positioning slide 228 is moved downwardly, the roll 274 will be swung back into its full line position, Fig. 8.

The roll 280 will preferably be transversely corrugated as shown in Fig. 4 and a plurality of other rolls 284, 284, herein two, may be provided to facilitate the forward movement of the ice cream bricks. These rolls like the roll 280 are mounted for free rotation upon rods 286, 286 extending transversely of the machine having bearing at their ends in the side members of the frame.

By transversely corrugating the rolls 280 and 284 as above referred to any superfluous or melted cream which may have been carried to said rolls will squeeze or drip down through said corrugations or grooves and not cause the wrapper to stick to the rolls rather than to the cream as it otherwise would.

Figures 8, 9:
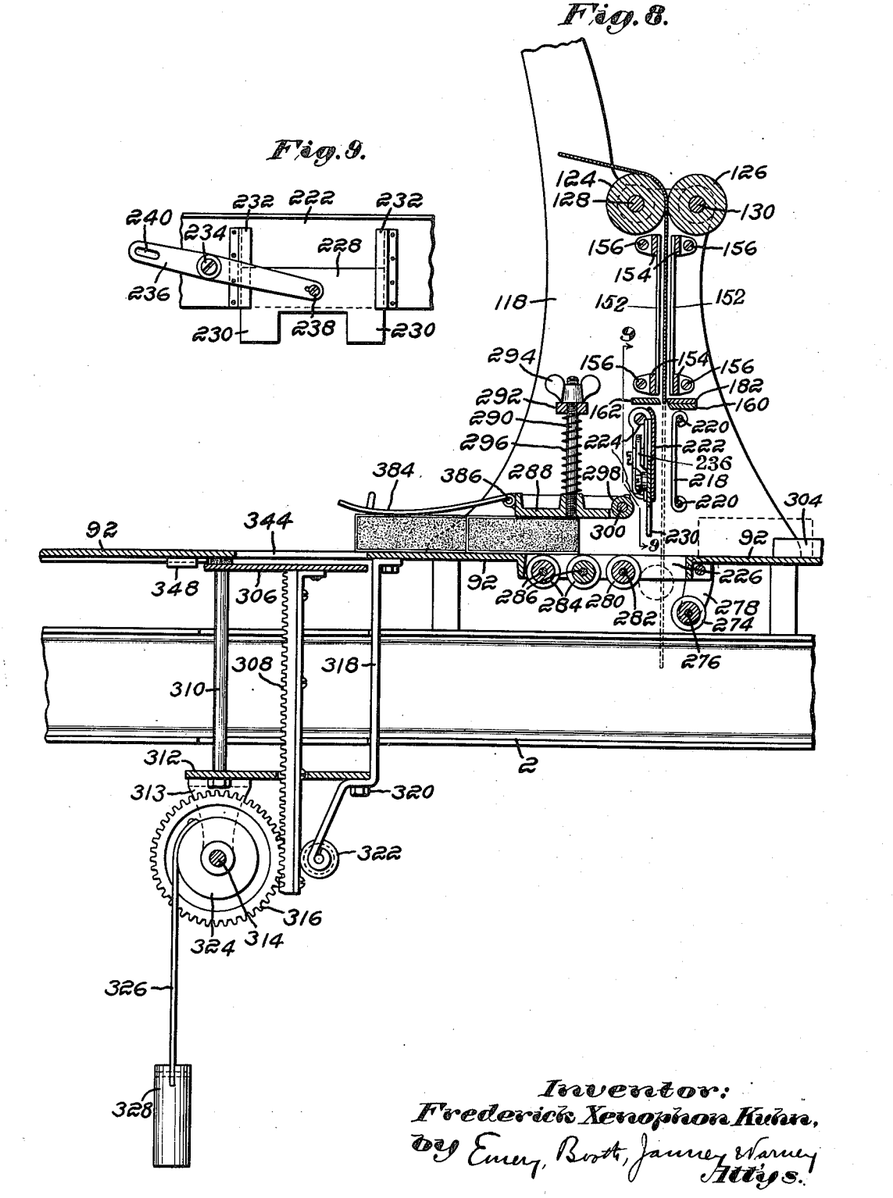
Fig. 8 is detail longitudinal section showing more particularly the wrapping mechanism.
Fig. 9 is a sectional elevation on line 9—9 of Fig. 8.

The wrapping mechanism comprises suitable means, herein conveniently termed wiper means to cooperate with the upper and lower surfaces of the ice cream brick to wipe the wrapping paper over said surfaces and lay it down thereon. A presser 288, consisting of a horizontal plate, extends transversely of the machine and is secured to rods 290, one of which is shown in Fig. 8, said rods being adjacent opposite ends of said plate and having their upper ends extending through ears 292 projecting inwardly from the standards 118. Above said ears 292, said rods 290 are provided with wing nuts 294 and a spring 296 surrounds each rod and has bearing at one end upon the plate 288 and at its other end upon the under side of the ear 292. At its right edge, referring to Fig. 8, the plate 288 carries a roll 298 loosely mounted for free rotation upon a rod 300. The plate 288 is thus yieldingly pressed downwardly, and being located at substantially the level of the upper surface of the ice cream bricks the roll 298 will yieldingly engage the paper at the front of the bricks as they are pushed forward and will wipe the paper over said edge and lay it down along the top surface of the brick as shown in Fig. 8. In the same manner the roll 280 above described will engage the paper at the lower front edge of the bricks and will wipe the paper over said edge and lay it along the under surface of the brick.

Between the ice cream cutting mechanism and the wrapping mechanism the plate 92 will preferably be provided with longitudinal openings 302, Fig. 4, to drain off any melted ice cream and at substantially the same place lateral guides 304, 304 may be provided for guiding the bricks as they are pushed forward to the wrapping mechanism.

The invention contemplates the provision of means for stacking the wrapped ice cream bricks in order to facilitate handling thereof by the operator. Said stacking means in the embodiment of the invention herein shown comprises a table 306, Fig. 8, secured to the upper end of a rack 308, said plate 306 being provided with a guide opening through which extends a rod 310 projecting downwardly from the under side of the plate 92. Said rod 310 is secured at its lower end to a bracket 312. In two downwardly projecting extensions 313, 315 of the bracket 312 is secured a shaft 314 carrying a gear 316 adapted to mesh with the rack 308. The bracket 312 is also supported by a rod 318 bolted at its upper end to the under side of the plate 92 and at 320 to said bracket, a downwardly extending prolongation of said rod 318 carrying a roll 322 for maintaining the rack in mesh with the gear 316. To a drum 324 connected to the gear 316 and co-axial therewith is secured one end of a flexible connection 326 carrying at its other end a weight 328.

To one end of the drum 324 is secured a ratchet 330 with the teeth 332 of which is adapted to cooperate a push pawl 334. This push pawl has its shank guided in a guide 336 secured to the frame of the machine, said shank being connected to one end of a rod 338, the other end of which is connected to the free end of the arm 110 of the bell crank lever that is pivoted at 108 and which is connected by the rod 112 with the lever 62 of the ice cream block feeding mechanism. A locking pawl 340 is pivoted at 342 on the bracket 315, said pawl cooperating with the teeth of the ratchet 330 to lock said ratchet in position.

Figure 2:
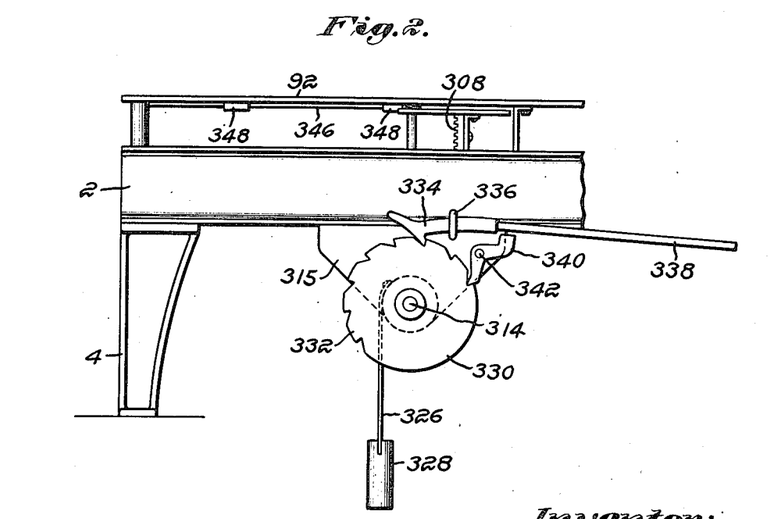
Fig. 2 is a side elevation of the end of the machine opposite to that end represented in Fig. 1.

From the construction described it will be clear that at each feeding movement of the lever 62 the pawl 334 will be drawn backwardly or to the right, Fig. 2, thus turning the ratchet 330 the distance of one tooth of said ratchet. This happens at each reciprocation of the lever 62, the locking pawl 340 cooperating to lock the ratchet in place after each increment of rotation thereof by the pawl 334. The drum 324 and gear 316 will thus be rotated one increment for each feed stroke of the ice cream feeding mechanism and the ratchet with its table 306 will thus be lowered a proportional distance at each feed. The spacing of the teeth 332 of the ratchet 330 is such as to conform to the spacing of the teeth of the rack 40 so that for each reciprocation of the pawl 334 the table 306 will thus be lowered the thickness of an ice cream brick. Variations in the spacing of the teeth 332 may be and preferably are herein effected by replacing the ratchet 330 with others having teeth corresponding with those of the rack 40, the throw of the pawl 334 being invariable but sufficient in extent to include the longest tooth used.

In this rotation of the gear 316 the flexible connection 326 of the weight 328 is wound up step by step on the drum 324. The wrapped bricks being fed forward one by one by the action of the pusher 186 on the rearmost one of the line of bricks resting on the table 92 arrive one by one over the opening 344 over the table 306 and as by the mechanism just described the table is lowered substantially the thickness of one brick at each feed movement of the machine, it will be seen that the wrapped bricks will be stacked up one above the other on the table 306. If the transverse and longitudinal cutter for the ice cream is used the wrapped bricks will thus be stacked up in two columns side by side on the table 306 when the latter has reached the limit of its downward movement. This has been so calculated that when the table 306 reaches its downward movement it will be loaded with two columns of wrapped bricks, each column representing a quart of ice cream. Each of the stacks will contain six, seven, eight or other numbers of wrapped bricks according as the feed rack 40 used is the one having the teeth spaced for making six cuts, seven cuts, eight cuts or other number of cuts to the quart.

When the table 306 has reached its lowermost position, the pawl 340 may be released from the ratchet 330 whereupon the weight 328 will cause the gear 316 to rotate in the opposite direction thus raising the rack and table 306 into position shown in Fig. 8 with the stacked and wrapped bricks thereon ready to be removed and packed.

When there is a wrapped brick on the table 306 and the next brick is fed forward onto said brick that is already upon said table it is found there is a tendency for the paper on the upper surface of the lower brick to rough up. The present invention accordingly contemplates the provision of means to meet this difficulty, said means herein comprising a slide 346, Fig. 3, guided for longitudinal movement in guides 348, 348, 348, 348 secured to the under side of the plate 92. To the middle of the slide is pivotally secured one end of a link 350, the other end of which is pivoted at 352 to the free end of the lever 264 already referred to. At each reciprocation of the rod 256 which actuates the table 306, the slide 346 is moved forward to cause its two portions 354 to project across the opening 344 through which the wrapped bricks are received on the table 306. The slide 346 is thus moved forward across said opening before each wrapped brick is fed over said opening, and will thus separate each brick as it is fed onto the next lower one on the table 306, thus holding the paper on the lower brick in place and preventing the paper on the lower brick from being roughed up or otherwise displaced. The slide 346 is withdrawn before the next downward movement of the table 306.

The machine may be operated by hand if desired by rotating the fly wheel 356. I prefer, however, to operate my machine by power and to that end I have shown an electric motor 358, Fig. 1, of any suitable construction mounted upon an upward extension 360 of the standard 34. The two poles of the motor are connected to the two poles of a switch 362 having a handle 364 and adapted to cooperate with two contacts 366 connected with any suitable source of electric power, not shown. The shaft of the motor 358 is provided with a pinion 368 which meshes with gear teeth 370 of the periphery of the fly wheel 356. If the switch 362 be closed, the machine will be set in operation.

Herein means are provided automatically to arrest the operation of the machine when the desired number of wrapped bricks have been stacked up on the table 306. Said means herein comprise a lever 372 pivoted at 374 with the frame of the machine and having one end beneath the switch handle 364 and the other end provided with a pin 376. A spring 378 connected at one end to said lever 372 and at its other to the frame of the machine tends to draw the upper end of said lever toward the machine and to throw the other end of said lever outwardly to act upon the switch handle 364 and thus throw out the switch. The pin 376 rests against the edge of the feed rack 40 and in this position the other end of the lever 372 will be out of contact with the switch handle 364. The pin 376, however, is in the path of movement of one or more recesses 380, 382 provided in the side of the feed rack 40, and when in the forward movement of the feed rack one of these openings comes into registration with said pin 376, the spring 378 will draw the upper end of the lever 372 inwardly, thus throwing outwardly the lower end of said lever which acting upon the switch handle 364 throws out the switch and arrests the operation of the machine. The recesses 380, 382 will be placed at every 6th, 7th, 8th or other tooth from the forward end of the rack according as there are to be six, seven, eight, or other numbers of bricks cut to the quart.

The operation of the machine is briefly as follows:—Assuming that the switch 362 is open and that both the transverse cutter 6 and longitudinal cutter 78 are used, a block of ice cream 36, Fig. 1, is placed upon the table 38 with its rear end face against the follower 52. The switch 362 is then thrown in, thus setting the machine in operation and the ice cream block 36 will be fed forward step by step to the cutting mechanism which will operate to sever therefrom two bricks at a time as the block of ice cream 36 advances. Each time that a recess 380 or 382 receives opposite the pin on the lever 372 the machine will automatically stop as already described.

The two bricks as they are severed from the end of the block 36 are deposited or tipped onto the table 92 by the member 94 and are then pushed forward by the pusher 186 against the two strips of paper which have been severed by the cutter 160, 162 and are held clamped between the rolls 274 and 280. The front surfaces of the two bricks meet the two severed lengths of paper at about half way thereof and as the two bricks are pushed over the rolls 280 and 284 and in under the presser 288, the paper is bent back over the upper and lower front edges of the bricks and laid along the upper and lower surfaces thereof by the roller 298 and roller 280. The bricks are thus fed along successively over the plate 306 and are stacked in two parallel stacks upon the latter as already described.

It will be understood that the slide 228 and extension 230 will be operated at suitable times as already described.

Means may be provided to steady the leading wrapped bricks as they approach the plate 306. Any suitable means may be used for this purpose, but I preferably use a plate 384 pivoted at 386 to the presser 288 and adapted to rest by its own weight on the leading bricks.

It will be seen from the above description that there is herein described apparatus in which the several features of this invention are embodied, and which apparatus in its action attains the various objects of the invention and is well suited to meet the requirements of practical use.

It will be apparent to those skilled in the art that it is not indispensable that all of the features of the invention be used conjointly, since they may be used to advantage separately, in various combinations and sub-combinations. Furthermore as many changes could be made in the above construction and many apparently widely different embodiments of this invention could be made without departing from the scope thereof, it is intended that all matter contained in the above description, or shown in the accompanying drawings, shall be interpreted as illustrative and not in a limiting sense, the true scope of the invention being definitely set forth by the claims.

Claims:

1. In a machine of the class described, in combination, wrapping means comprising a paper supply; means to feed paper from said paper supply; cutter means spaced from said paper feeding means to sever a section of paper from the paper fed by said feeding means; actuating means for said cutter means; guiding means to guide the paper from said feeding means to said cutter means; paper clamping means; actuating means therefor; guiding means for the paper intermediate said cutter means and said clamping means; and means to wrap a severed section of the paper about a piece of the material to be wrapped.

2. In a machine of the class described, in combination, wrapping means comprising a paper supply; means to feed a section of paper from said supply into the path of movement of a piece of the material to be wrapped; guiding means for the paper; cutter means to sever from the supply the section of paper fed into the path of movement of said piece of material to be wrapped; actuating means for said cutter means; spaced wiper means to wipe the paper over opposite faces of the piece of material to be wrapped; means to feed a piece of the material to be wrapped, first to cause its leading end face to contact with said section of paper intermediate the ends thereof and then to cause said piece of material to penetrate between said spaced wiper means carrying the severed paper section with it, so as to cause said wiper means to wipe the portions of the severed section of paper projecting beyond the leading end face of said piece of material into contact with opposite faces of said piece of material; and means yieldingly to clamp the severed section of paper intermediate its leading end and said piece of material as the latter is fed between said wiper means.

3. In a machine of the class described, in combination, wrapping means comprising a paper supply; means to feed a section of paper from said supply into the path of movement of a piece of the material to be wrapped; guiding means for the paper; cutter means to sever from the supply the section of paper fed into the path of movement of said piece of material to be wrapped; actuating means for said cutter means; spaced wiper means comprising rollers to wipe the paper over opposite faces of the piece of material to be wrapped; means to feed a piece of the material to be wrapped, first to cause its leading end face to contact with said section of paper intermediate the ends thereof and then to cause said piece of material to penetrate between said spaced wiper means carrying the severed paper section with it, so as to cause said rollers to wipe the portions of the severed section of paper projecting beyond the leading end face of said piece of material into contact with opposite faces of said piece of material; and means yieldingly to clamp the severed section of paper intermediate its leading end and said piece of material as the latter is fed between said wiper means.

4. In a machine of the class described, in combination, wrapping means comprising a paper supply; means to feed paper from said paper supply across the path of movement of a piece of material to be wrapped; wiper means; means to feed a piece of material to be wrapped into contact with the wrapping paper and to said wiper means; positioning means to position the paper relative to the piece of material to be wrapped, said positioning means being normally in the path of movement of the piece of material to be wrapped; and means to withdraw said positioning means from said path of movement and to restore it to its normal position, at the proper time.

5. In a machine of the class described, in combination, wrapping means to wrap the pieces of material cut by the machine; stacking means for the wrapped pieces of material; and actuating means common to said wrapping and stacking means to feed the wrapped pieces of material from said wrapping means to said stacking means.

6. In a machine of the class described, in combination, wrapping means to wrap the pieces of material cut by the machine; stacking means for the wrapped pieces of material; means common to said wrapping and stacking means to feed the wrapped pieces of material from said wrapping means to said stacking means, and means automatically to stop the machine when a predetermined number of pieces of material have been stacked.

7. In a machine of the class described, in combination, wrapping means to wrap the pieces of material cut by the machine, stacking means, comprising a table; means to feed pieces of wrapped material successively into position above said table; and means to lower said table substantially the thickness of a piece of wrapped material between each feed stroke of said feeding means.

8. In a machine of the class described, in combination, wrapping means to wrap the pieces of material cut by the machine, stacking means comprising a table, means to feed pieces of wrapped material successively into position above said table, and means to move said table substantially the thickness of a piece of wrapped material between each feed stroke of said feeding means.

9. In a machine of the class described, in combination, wrapping means to wrap the pieces of material cut by said machine; stacking means comprising a table; means to feed pieces of wrapped material successively into position above said table; means interposable between said table and a piece of wrapped material; actuating means including parts common to said wrapping and stacking means to interpose said last named means between said table and a piece of wrapped material as the latter is fed into position above said table and to withdraw it when said piece of material is positioned above said table; and means to lower said table substantially the thickness of a piece of wrapped material between each feed stroke of said feeding means.

10. In a machine of the class described, in combination, power driven ice cream cutting and wrapping mechanisms; and means actuated by a moving part of said mechanism to stop the machine after a predetermined number of pieces have been wrapped.

11. In a machine of the class described, in combination, wrapping means; means to feed the material to be cut; power means for operating the machine; and means actuated by the feeding means to arrest the operation of the machine at a predetermined time.

12. In a machine of the character described, means for feeding material; means to wrap the material including an upwardly yielding presser having a roller at its forward edge; and means for actuating said wrapping means including portions of said feeding means.

13. In a machine of the character described, means automatically to feed material; means to wrap said material including an upper yielding presser having a roller at its forward edge; and actuating mechanism for said wrapping means including portions of said feeding means.

14. In a machine of the character described, a wrapping material supply; means to feed said wrapping material from said supply into wrapping relation to the pieces to be wrapped; and a removable guide for said wrapping material.

15. In a machine of the class described, in combination, wrapping means comprising a paper supply, means to feed paper from said paper supply, cutter means to sever a section from the paper fed by said feeding means, and means to wrap a severed section of paper about a piece of material including a series of rollers arranged along the path of travel of said piece of material to engage the bottom thereof and a yielding roller edged presser to engage the top of said material.

16. In a machine of the class described, in combination, wrapping means comprising means to feed paper, cutter means to sever a section of said paper, means to wrap a severed section of paper about a piece of material to be wrapped including rollers arranged along the path of movement of said wrapped material above and below said material, and means to hold and retard said paper during the wrapping operation including a roll mounted to cooperate with one of the aforesaid rollers.

17. In a machine of the class described, in combination, wrapping means comprising a paper supply, means to feed the paper from said paper supply, cutter means to sever a section from the paper fed by said feeding means, means to move the material to be wrapped against said paper, a series of rollers along which said material and said section of paper are arranged to move, friction means to fold said paper against the top of said material, and means to retard the movement of said paper with said material including a roll mounted to cooperate with one of the rolls of said series to engage opposite faces of the section of said paper.

18. In a machine of the character described, in combination, means automatically to feed material including longitudinally spaced guide members to effect the escape of melted and superfluous material, means to supply wrappers to the material and means to wrap said wrappers about said material including at least one transversely corrugated roll.

19. In a machine of the character described, in combination, means automatically to feed material including longitudinally spaced guide members to effect the escape of melted and superfluous material, means to supply wrappers to the material and means to wrap said wrappers about said material including a plurality of rollers having transverse corrugations to carry away superfluous material from the feeding surfaces of said rollers.

20. In a machine of the character described, in combination, means automatically to feed ice cream and wrapping means for said ice cream including a plurality of transversely corrugated rollers, the corrugations whereof are adapted to effect the escape of superfluous cream from the guiding surfaces of said rollers.

21. In an ice cream wrapping machine, paper feeding means and means to wrap said paper about the ice cream including at least one transversely corrugated roller, the corrugations whereof are adapted to permit the escape of superfluous cream from the working face of said roller.

In testimony whereof, I have signed my name to this specification.

FREDERICK XENOPHON KUHN.